UNITED STATES PATENT OFFICE.

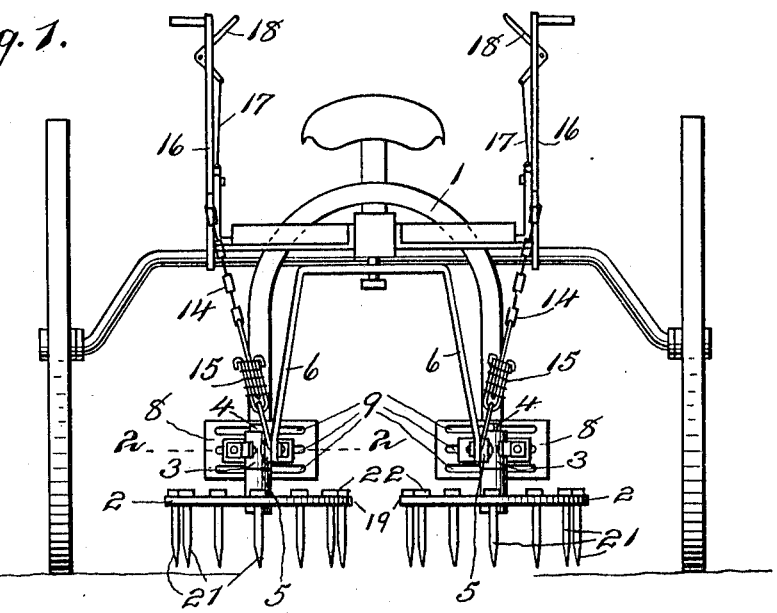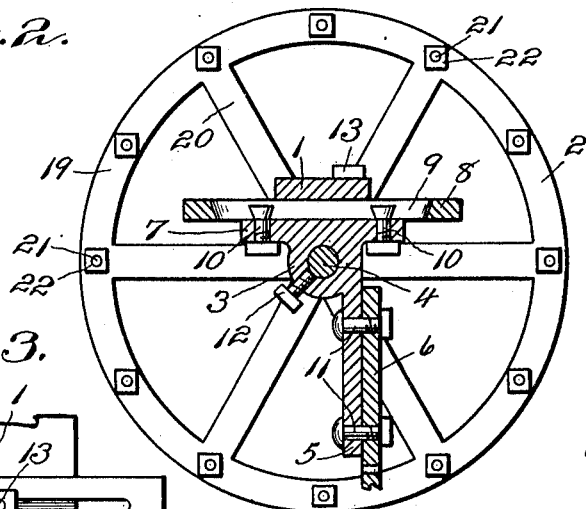

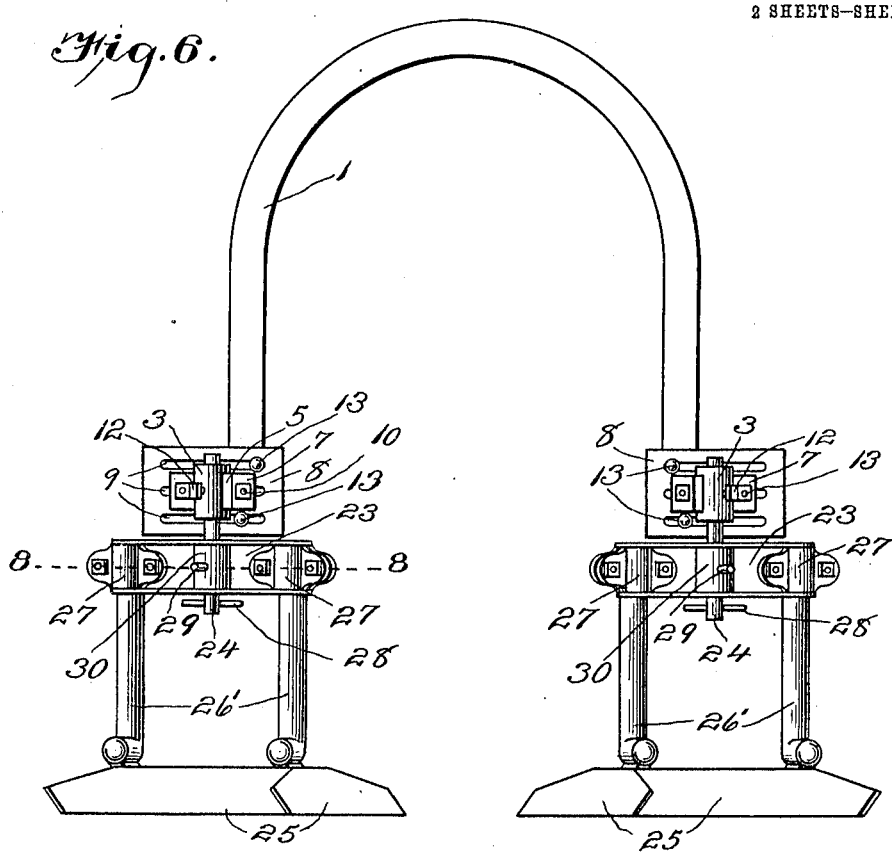
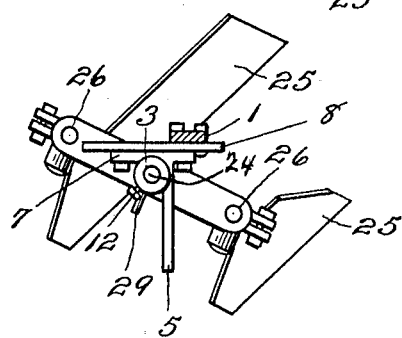
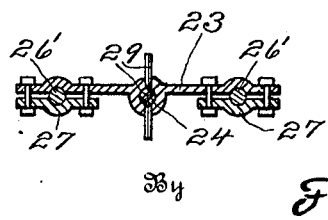

HECTOR OLSON AND CHRIST M. JOHNSON, OF MORRIS, ILLINOIS.

CONVERTIBLE HARROW AND CULTIVATOR.

984,291.   Specification of Letters Patent.   Patented Feb. 14, 1911.

Application filed June 6, 1910. Serial No. 565,399.

*To all whom it may concern:*

Be it known that we, HECTOR OLSON and CHRIST M. JOHNSON, citizens of the United States, residing at Morris, county of Grundy, State of Illinois, United States of America, have invented certain new and useful Improvements in Convertible Harrows and Cultivators, of which the following is a specification, reference being had therein to the accompanying drawing.

Our invention relates to agricultural implements, has especial reference to convertible harrows and cultivators, by which soil is first prepared by the harrows for planting, and is subsequently used as a cultivator for a growing crop, has for its object an efficient and readily convertible machine for the purpose, and the invention consists in certain improvements in construction which will be fully described in the following specification and claims.

In the accompanying drawings which form part of this specification Figure 1 represents a front elevation of an implement embodying our invention. Fig. 2 is an enlarged plan view partly in section on the line 2—2 Fig. 1. Fig. 3 is an elevation of the rear clamping plate and part of the yoke. Fig. 4 is a side view of the hub piece detached, to which the harrow and the cultivator are attached. Fig. 5 is a front view of the same. Fig. 6 is a front elevation of the yoke or arch with cultivators attached thereto. Fig. 7 is a top plan view partly in section of one pair of the cultivators, and Fig. 8 is a horizontal section on line 8—8, Fig. 6 on a reduced scale.

Reference being had to the drawings and the designating characters thereon the numeral 1 indicates a vertical yoke or arch properly secured to the frame work of the machine, and on each end of which a rotary harrow 2, is attached.

3 is a hub to receive the axle 4 of the harrow and from one side thereof extends an arm 5 to which the arm 6 of the draw bar is secured, and in the rear of the hub is a plate 7 by which the hub is secured to an adjustable clamping plate 8 having a plurality of horizontal slots 9 for regulating the vertical position of the harrow with relation to the ground, and the lateral position thereof by lateral adjustment in said slots. The hub is secured in position on the yoke by bolts 10, 10 which engage the plate 8, and the draw-bar is secured to the arm 5 by bolts 11, 11, shown in Fig. 2, and the axle is secured in its highest position, when not in use, by a stub-bolt or set screw 12. The clamping-plate 8 is secured to the arch or yoke by bolts 13, 13.

The evener to which the whiffletrees are attached have been omitted from the drawings to avoid confusion, and may be of any preferred construction.

14, 14 indicate chains provided with springs 15 attached to the arm 6 and to a lever 16, for raising the harrows, and 17, 17 indicate pawls operated by levers 18, 18 for securing the harrows in any desired position. The harrows comprise a plate 19 having radial arms 20, and the teeth 21 extend through the plate 19 and are secured by nuts 22.

In Fig. 6 we have shown the application of a cultivator to the arch or yoke 1, by means of a yoke or head 23 on each end of the yoke, which is connected to the hub 3 by an axle 24 and the scrapers 25 are provided with journals 26 at the upper end of the rods 26', which engage journal boxes 27 in the head, and extending through the axle 24 is a cotter-pin 28 to prevent the head separating from the axle.

29 indicates a break-pin made of wood and extends through the hub 30 on the head 23 and the axle 24 to hold the scrapers against rotation while in use, yet being sufficiently fragile to be broken when the scrapers encounter an obstruction, such as a rock, large stone, stump, or the like, and prevent breaking of the cultivator.

The harrows and the cultivators are readily interchangeable, thus combining the two in one machine.

Having thus fully described our invention, what we claim is—

1. In an implement of the kind described, a vertical yoke having secured on each end thereof a member provided with a hub, an arm for attaching a draw-bar thereto and an attaching plate, a clamping-plate, and an implement for tilling the soil.

2. In an implement of the kind described, a vertical yoke having a member secured on each end thereof provided with a hub, an arm for attaching a draw-bar thereto and an attaching plate, a clamping-plate provided with a plurality of horizontal slots, and an implement for tilling the soil, said implement being vertically and laterally adjustable on said yoke.

In testimony whereof we affix our signatures in the presence of two witnesses.

HECTOR OLSON.
CHRIST M. JOHNSON.

Witnesses:
OLE ENGLE,
ANDREW H. SOREN.